(12) United States Patent
Simmons (10) Patent No.: US 7,659,890 B2
(45) Date of Patent: Feb. 9, 2010

(54) AUTOMATIC HEIGHT ADJUSTMENT FOR ELECTRONIC HIGHLIGHTER PENS AND MOUSING DEVICES

(75) Inventor: Alex J. Simmons, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 535 days.

(21) Appl. No.: 10/804,616

(22) Filed: Mar. 19, 2004

(65) Prior Publication Data

US 2005/0206627 A1    Sep. 22, 2005

(51) Int. Cl.
*G09G 5/00* (2006.01)
(52) U.S. Cl. .................. 345/179; 345/173; 345/156
(58) Field of Classification Search ............. 345/179, 345/173, 156; 715/859–863
See application file for complete search history.

(56) References Cited

U.S. PATENT DOCUMENTS

| | | | |
|---|---|---|---|
| 2,354,332 A | 7/1944 | Polydoroff | |
| 5,063,376 A | 11/1991 | Chang | 345/163 |
| 5,063,600 A | 11/1991 | Norwood | 345/173 |
| 5,133,076 A | 7/1992 | Hawkins et al. | 708/141 |
| 5,231,698 A | 7/1993 | Forcier | 715/541 |
| 5,321,768 A | 6/1994 | Fenrich et al. | 382/178 |
| 5,327,342 A | 7/1994 | Roy | 345/467 |
| 5,339,391 A | 8/1994 | Wroblewski et al. | |
| 5,347,295 A | 9/1994 | Agulnick et al. | |
| 5,367,453 A | 11/1994 | Capps et al. | 715/531 |
| 5,390,281 A | 2/1995 | Luciw et al. | 395/12 |
| 5,404,442 A | 4/1995 | Foster et al. | 395/159 |
| 5,434,929 A | 7/1995 | Beernink et al. | 382/187 |
| 5,442,742 A | 8/1995 | Greyson et al. | 715/539 |
| 5,446,882 A | 8/1995 | Capps et al. | 707/104.1 |
| 5,465,325 A | 11/1995 | Capps et al. | 345/441 |
| 5,477,447 A | 12/1995 | Luciw et al. | 704/9 |
| 5,479,596 A | 12/1995 | Capps et al. | 715/539 |
| 5,491,495 A | 2/1996 | Ward et al. | 345/173 |
| 5,500,937 A | 3/1996 | Thompson-Rohrlich | |
| 5,513,309 A | 4/1996 | Meier et al. | 715/860 |
| 5,517,578 A | 5/1996 | Altman et al. | |

(Continued)

FOREIGN PATENT DOCUMENTS

DE    40 26 852 A1    2/1991

(Continued)

OTHER PUBLICATIONS

Microsoft Word 2000, Microsoft Corporation (9.0.6926 sp-3).*

(Continued)

*Primary Examiner*—Richard Hjerpe
*Assistant Examiner*—Leonid Shapiro
(74) *Attorney, Agent, or Firm*—Merchant & Gould; Ryan T. Grace (57) ABSTRACT

Methods and systems provide for automatic adjustment of electronic highlighter cursor height in response to a determined height of images or typed or handwritten text to be highlighted. The highlighter thickness or cursor height of an electronic highlighter, such as an electronic pen or mousing device, automatically adjusts based on the text or images the user is highlighting. When the user focuses the electronic highlighter on text or images to be highlighted, the height of the text or images is determined, and the height or thickness of the highlighter cursor is automatically adjusted.

11 Claims, 5 Drawing Sheets

U.S. PATENT DOCUMENTS

| | | | |
|---|---|---|---|
| 5,523,775 A * | 6/1996 | Capps | 345/179 |
| 5,528,743 A | 6/1996 | Tou et al. | 715/541 |
| 5,544,295 A | 8/1996 | Capps | 345/473 |
| 5,544,358 A | 8/1996 | Capps et al. | 715/523 |
| 5,555,363 A | 9/1996 | Tou et al. | 715/541 |
| 5,559,942 A | 9/1996 | Gough et al. | |
| 5,561,446 A | 10/1996 | Montlick | 345/173 |
| 5,579,467 A | 11/1996 | Capps | 715/507 |
| 5,583,542 A | 12/1996 | Capps et al. | |
| 5,588,105 A | 12/1996 | Foster et al. | 715/779 |
| 5,590,257 A | 12/1996 | Forcier | |
| 5,592,566 A | 1/1997 | Pagallo et al. | 382/187 |
| 5,594,640 A | 1/1997 | Capps et al. | 715/532 |
| 5,596,350 A | 1/1997 | Capps et al. | 345/173 |
| 5,596,694 A | 1/1997 | Capps | 345/473 |
| 5,596,697 A | 1/1997 | Foster et al. | 715/810 |
| 5,602,570 A | 2/1997 | Capps et al. | 345/173 |
| 5,613,019 A | 3/1997 | Altman et al. | 382/311 |
| 5,634,102 A | 5/1997 | Capps | 715/744 |
| 5,649,133 A | 7/1997 | Arquie | 715/764 |
| 5,655,136 A | 8/1997 | Morgan | 382/187 |
| 5,666,139 A | 9/1997 | Thielens et al. | 345/173 |
| 5,666,552 A | 9/1997 | Greyson et al. | 715/539 |
| 5,671,438 A | 9/1997 | Capps et al. | 715/539 |
| 5,682,439 A | 10/1997 | Beernink et al. | 382/187 |
| 5,710,831 A | 1/1998 | Beernink et al. | 382/189 |
| 5,745,716 A | 4/1998 | Tchao et al. | 715/777 |
| 5,757,383 A * | 5/1998 | Lipton | 345/442 |
| 5,760,773 A | 6/1998 | Berman et al. | |
| 5,764,818 A | 6/1998 | Capps et al. | 382/317 |
| 5,768,418 A | 6/1998 | Berman et al. | 382/187 |
| 5,778,404 A | 7/1998 | Capps et al. | 715/531 |
| 5,796,397 A | 8/1998 | Kusano | 715/804 |
| 5,809,498 A | 9/1998 | Lopresti et al. | |
| 5,838,326 A | 11/1998 | Card et al. | 715/775 |
| 5,838,819 A | 11/1998 | Ruedisueli et al. | |
| 5,864,635 A | 1/1999 | Zetts et al. | 382/187 |
| 5,867,150 A | 2/1999 | Bricklin et al. | |
| 5,874,957 A | 2/1999 | Cline et al. | |
| 5,880,743 A | 3/1999 | Moran et al. | 345/473 |
| 5,911,145 A | 6/1999 | Arora et al. | 715/514 |
| 5,953,735 A | 9/1999 | Forcier | |
| 5,963,208 A | 10/1999 | Dolan et al. | 715/760 |
| 5,970,455 A | 10/1999 | Wilcox et al. | |
| 6,020,895 A | 2/2000 | Azami | 345/619 |
| 6,021,218 A | 2/2000 | Capps et al. | 382/187 |
| 6,035,324 A | 3/2000 | Chang et al. | 709/203 |
| 6,061,472 A | 5/2000 | Hullender et al. | 382/187 |
| 6,069,626 A | 5/2000 | Cline et al. | |
| 6,081,829 A | 6/2000 | Sidana | |
| 6,108,445 A | 8/2000 | Uehara | 382/189 |
| 6,108,463 A | 8/2000 | Herron et al. | |
| 6,128,007 A | 10/2000 | Seybold | 345/179 |
| 6,128,633 A | 10/2000 | Michelman et al. | |
| 6,154,219 A | 11/2000 | Wiley et al. | 345/587 |
| 6,154,758 A | 11/2000 | Chiang | |
| 6,188,405 B1 | 2/2001 | Czerwinski et al. | 715/764 |
| 6,199,125 B1 | 3/2001 | Cortesi | 710/67 |
| 6,223,145 B1 | 4/2001 | Hearst | 703/22 |
| 6,243,258 B1 | 6/2001 | Paratore | 361/680 |
| 6,279,014 B1 | 8/2001 | Schilit et al. | |
| 6,295,372 B1 | 9/2001 | Hawkins et al. | |
| 6,304,272 B1 | 10/2001 | Schanel et al. | 345/676 |
| 6,337,698 B1 | 1/2002 | Keely, Jr. et al. | 715/823 |
| 6,340,967 B1 | 1/2002 | Maxted | |
| 6,345,389 B1 | 2/2002 | Dureau | 725/116 |
| 6,348,935 B1 | 2/2002 | Malacinski et al. | 715/853 |
| 6,355,889 B1 | 3/2002 | Butcher et al. | |
| 6,380,957 B1 | 4/2002 | Banning | 715/828 |
| 6,487,567 B1 | 11/2002 | Michelman et al. | |
| 6,487,569 B1 | 11/2002 | Lui et al. | |
| 6,492,125 B2 | 12/2002 | Kauvar et al. | |
| 6,529,215 B2 | 3/2003 | Golovchinsky et al. | |
| 6,546,397 B1 | 4/2003 | Rempell | 707/102 |
| 6,559,871 B1 | 5/2003 | Brozowski et al. | 715/853 |
| 6,565,611 B1 | 5/2003 | Wilcox et al. | |
| 6,570,596 B2 | 5/2003 | Frederiksen | 715/808 |
| 6,594,390 B2 | 7/2003 | Frink et al. | |
| 6,650,347 B1 | 11/2003 | Nulu et al. | 715/853 |
| 6,651,221 B1 | 11/2003 | Thompson et al. | |
| 6,654,035 B1 | 11/2003 | DeStefano | |
| 6,661,409 B2 | 12/2003 | Demartines et al. | |
| 6,678,865 B1 | 1/2004 | Pratley et al. | |
| 6,681,045 B1 | 1/2004 | Lapstun et al. | 382/187 |
| 6,683,600 B1 * | 1/2004 | Lui | 345/179 |
| 6,690,364 B1 | 2/2004 | Webb | |
| 6,727,927 B1 | 4/2004 | Dempski et al. | 345/853 |
| 6,741,749 B2 | 5/2004 | Herbert, Jr. | |
| 6,801,190 B1 | 10/2004 | Robinson et al. | 345/173 |
| 6,833,827 B2 | 12/2004 | Lui et al. | |
| 6,836,759 B1 | 12/2004 | Williamson et al. | 704/235 |
| 6,859,909 B1 | 2/2005 | Lerner et al. | 715/512 |
| 6,989,822 B2 | 1/2006 | Pettiross et al. | 345/179 |
| 7,002,560 B2 | 2/2006 | Graham | |
| 7,039,234 B2 | 5/2006 | Geidl et al. | 382/187 |
| 7,055,110 B2 | 5/2006 | Kupka | 715/863 |
| 7,079,713 B2 | 7/2006 | Simmons | 382/321 |
| 7,091,959 B1 | 8/2006 | Clary | 345/173 |
| 7,096,432 B2 | 8/2006 | Huapaya et al. | 715/863 |
| 7,174,042 B1 | 2/2007 | Simmons et al. | 382/187 |
| 7,185,278 B1 | 2/2007 | Simmons | 715/235 |
| 7,188,309 B2 | 3/2007 | Simmons et al. | 715/244 |
| 7,240,300 B2 | 7/2007 | Jaeger | 715/863 |
| 7,259,752 B1 | 8/2007 | Simmons | 345/173 |
| 7,259,753 B2 | 8/2007 | Keely et al. | 345/179 |
| 7,353,453 B1 | 4/2008 | Simmons | 715/268 |
| 7,358,965 B2 | 4/2008 | Barabe et al. | 345/179 |
| 7,370,288 B1 | 5/2008 | Simmons et al. | 715/854 |
| 2001/0000960 A1 | 5/2001 | Dettloff | 343/748 |
| 2002/0078035 A1 | 6/2002 | Frank et al. | 707/3 |
| 2002/0097270 A1 | 7/2002 | Keely et al. | 345/764 |
| 2002/0126153 A1 | 9/2002 | Withers et al. | 345/773 |
| 2003/0066031 A1 | 4/2003 | Laane | 715/513 |
| 2003/0071850 A1 | 4/2003 | Geidl | 345/781 |
| 2003/0085931 A1 | 5/2003 | Card et al. | 345/853 |
| 2003/0119469 A1 | 6/2003 | Karr et al. | 455/307 |
| 2003/0214491 A1 | 11/2003 | Keely et al. | 345/179 |
| 2003/0214531 A1 | 11/2003 | Chambers et al. | 345/764 |
| 2003/0215142 A1 | 11/2003 | Gounares | 382/190 |
| 2003/0227491 A1 | 12/2003 | Moehrle | 345/854 |
| 2004/0003350 A1 | 1/2004 | Simmons et al. | 715/517 |
| 2004/0021701 A1 * | 2/2004 | Iwema et al. | 345/863 |
| 2004/0060000 A1 | 3/2004 | Jaeger | 715/502 |
| 2004/0135824 A1 | 7/2004 | Fitzmaurice | 345/856 |
| 2004/0141015 A1 | 7/2004 | Fitzmaurice et al. | 345/856 |
| 2005/0028081 A1 | 2/2005 | Arcuri et al. | 715/501.1 |
| 2005/0179647 A1 | 8/2005 | Simmons et al. | 345/156 |
| 2005/0183029 A1 | 8/2005 | Barabe et al. | 715/779 |
| 2006/0001656 A1 | 1/2006 | LaViola et al. | 345/179 |
| 2006/0233464 A1 | 10/2006 | Simmons et al. | 382/321 |
| 2006/0267967 A1 | 11/2006 | Hinckley | 345/179 |

FOREIGN PATENT DOCUMENTS

| | | |
|---|---|---|
| EP | 0 460 420 A3 | 12/1991 |
| EP | 0 780 797 A | 6/1997 |
| EP | 1 376 390 A | 1/2004 |
| EP | 1 450 294 A1 | 8/2004 |
| EP | 1 486 883 A2 | 12/2004 |
| GB | 2 313 993 A | 12/1997 |

| JP | 3-270403 | 12/1991 |

OTHER PUBLICATIONS

Http://www.chemsoc.org/cgi-shell/empower.exe, IUPAC Compendium of Chemical Terminology, Chembytes Infozone, (updated May 10, 1998) pp. 1-5.
Lakowicz, Joseph R., Principles of Fluorescence Spectroscopy—2nd Ed., .COPYRGT.1999 Kluwer Academic/Plenum Publishers, p. 3.
Fitzmaurice et al., "Tracking Menus," CHI 2003, vol. 5, No. 2, pp. 71-80, 2003.
U.S. Official Action mailed Aug. 5, 2008, in U.S. Appl. No. 10/781,489.
U.S. Official Action mailed Jun. 28, 2007, in U.S. Appl. No. 10/781,489.
U.S. Official Action mailed Nov. 7, 2006, in U.S. Appl. No. 10/781,489.
U.S. Official Action mailed Apr. 20, 2006, in U.S. Appl. No. 10/781,489.
U.S. Official Action mailed Dec. 27, 2007, in U.S. Appl. No. 10/781,489.
U.S. Official Action mailed May 29, 2008, in U.S. Appl. No. 11/272,960.
U.S. Official Action mailed Aug. 20, 2008, in U.S. Appl. No. 10/780,366.
U.S. Official Action mailed Nov. 14, 2007, in U.S. Appl. No. 10/780,366.
U.S. Official Action mailed Sep. 20, 2005, in U.S. Appl. No. 10/186,463.
U.S. Official Action mailed May 18, 2007, in U.S. Appl. No. 10/186,820.
U.S. Official Action mailed Nov. 24, 2006, in U.S. Appl. No. 10/186,820.
U.S. Official Action mailed Nov. 9, 2006, in U.S. Appl. No. 10/186,820.
U.S. Official Action mailed Mar. 2, 2006, in U.S. Appl. No. 10/186,820.
U.S. Official Action mailed Aug. 10, 2005, in U.S. Appl. No. 10/186,820.
U.S. Official Action mailed Mar. 1, 2006, in U.S. Appl. No. 10/186,837.
U.S. Official Action mailed May 25, 2005, in U.S. Appl. No. 10/186,837.
U.S. Official Action mailed Dec. 17, 2004, in U.S. Appl. No. 10/186,837.
U.S. Official Action mailed Mar. 13, 2006, in U.S. Appl. No. 10/186,812.
U.S. Official Action mailed Jul. 13, 2005, in U.S. Appl. No. 10/186,812.
U.S. Official Action mailed Feb. 28, 2005, in U.S. Appl. No. 10/186,812.
U.S. Official Action mailed Apr. 21, 2006, in U.S. Appl. No. 10/186,865.
U.S. Official Action mailed Sep. 20, 2005, in U.S. Appl. No. 10/186,865.
U.S. Official Action mailed Aug. 22, 2007, in U.S. Appl. No. 10/186,874.
U.S. Official Action mailed Jan. 3, 2007, in U.S. Appl. No. 10/186,874.
U.S. Official Action mailed Aug. 10, 2006, in U.S. Appl. No. 10/186,874.
U.S. Official Action mailed Jun. 29, 2005, in U.S. Appl. No. 10/186,874.
U.S. Official Action mailed Sep. 15, 2006, in U.S. Appl. No. 10/186,847.
U.S. Official Action mailed Jan. 27, 2006, in U.S. Appl. No. 10/186,847.
U.S. Official Action mailed Jul. 27, 2005, in U.S. Appl. No. 10/186,847.
U.S. Official Action mailed Nov. 12, 2008, in U.S. Appl. No. 10/782,133.
U.S. Official Action mailed Feb. 20, 2008, in U.S. Appl. No. 10/782,133.
U.S. Official Action mailed Sep. 18, 2007, in U.S. Appl. No. 10/782,133.
U.S. Official Action mailed Mar. 2, 2007, in U.S. Appl. No. 10/782,133.
U.S. Official Action mailed Jan. 3, 2007, in U.S. Appl. No. 10/782,132.
U.S. Appl. No. 10/780,366, filed Feb. 17, 2004, entitled "Writing Guide for a Free-Form Document Editor", Inventors: Alex Simmons et al.
European Search Report dated Nov. 11, 2005.
Wacom Intuos TM User's Manual for Windows, May 22, 2000, copyright Wacom Company, Ltd., pp. 1-165 (Part 1: pp. 1-60; Part 2: pp. 61-120 ; Part 3, pp. 121-165).
U.S. Official Action mailed Feb. 3, 2009, in U.S. Appl. No. 10/781,489.
U.S. Official Action mailed Jun. 11, 2009, in U.S. Appl. No. 10/782,133.

* cited by examiner

AUTOMATIC HEIGHT ADJUSTMENT FOR ELECTRONIC HIGHLIGHTER PENS AND MOUSING DEVICES

FIELD OF THE INVENTION

The present invention generally relates to methods and systems for entering and manipulating data in a computing environment. More particularly, the present invention relates to automatically adjusting the cursor height for electronic input modes such as electronic pens and electronic mousing devices.

BACKGROUND OF THE INVENTION

Since the advent of the computer age, hardware and software systems have been developed for allowing users to efficiently enter and manipulate text and data that is displayed on a computer-generated display. In the early days of computing, users were primarily restricted to manipulating displayed text and data through a variety of keyboard strokes. The advent of mousing devices, including keyboard touch pads, gave users enhanced access to displayed data by allowing users to freely move a mouse pointer or cursor about displayed information for selecting data for manipulation or input. Recently, a variety of pen and ink systems have been developed that allow users to select and manipulate displayed text and data, as well as allow users to write electronically in free-form fashion by touching an electronic pen to the computer display screen.

Many modern computer systems are hybrids between tablets allowing only pen input and traditional computers allowing only keyboard or mouse input. Such hybrid systems allow data input and manipulation via keyboards, mousing devices, and electronic pen devices. Among the data input and manipulation enabled by such systems is highlighting. That is, many such systems allow mousing devices or electronic pens to act as highlighting pens so that a user may highlight text or images of an electronic document by dragging a mouse cursor or electronic pen tip across desired text and images. Unfortunately, prior systems do not account for the varying sizes of typed text, handwritten text or images. For example, a document may contain typed text that varies in font size, handwritten text of various sizes and images of varying sizes. If the user desires that the highlighter color height match the height of the text or images to be highlighted, the user must manually change the cursor height for the mouse cursor or electronic pen for each text or image selection to be highlighted. Accordingly, there is a need for a method and system for automatically adjusting the cursor height for electronic highlighters to a desirable height relative to typed or handwritten text or images to be highlighted. It is with respect to these and other considerations that the present invention has been made.

SUMMARY OF THE INVENTION

Embodiments of the present invention solve the above and other problems by providing for automatic adjustment of electronic highlighter ink or cursor height in response to a determined height of typed or handwritten text or images to be highlighted. Generally described, the highlighter ink height or cursor height of an electronic highlighter, such as an electronic pen or mousing device, automatically adjusts based on the text or images the user is highlighting. When the user focuses the electronic highlighter on text or images to be highlighted, the height of the text or image is determined, and the height of the highlighter cursor is adjusted.

According to aspects of the invention, a user selects a highlighting function so that the user's electronic pen or mousing device will function as an electronic highlighter. When the user touches the electronic pen to a particular text or image, or hovers the mousing device cursor over a particular text or image selection, the height of the text or image selection is determined. According to one aspect of the invention, the height is determined from the font size of typed text or from the height of handwritten text. According to another aspect of the invention, the highlighter height is determined from the average height of typed or handwritten characters without including the length of ascending or descending character segments. According to another aspect of the invention, the highlighter height is determined from the maximum height of typed or handwritten characters including the length of ascending or descending character segments. According to yet another aspect of the invention, if the user's display screen is in rule line mode, the distance between rule lines is adopted as the highlighter cursor height.

Once the highlighter cursor height is determined, that height is set for the highlighter cursor so that highlighter color or ink is drawn onto the computer-generated page during the duration of a given highlighter (electronic pen or mousing device) stroke. If the user lifts the electronic pen from the page, or otherwise disengages the highlighter device, the determined height is discarded. If the user begins a subsequent highlighting action, determination of the highlighter cursor height is repeated for the subsequent highlighting action.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION OF THE PREFERRED EMBODIMENT

As briefly described above, embodiments of the present invention are directed to methods and systems for providing automatic adjustment of electronic highlighter cursor height in response to a determined height of typed or handwritten text or in response to a determined height of a computer-displayed object. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
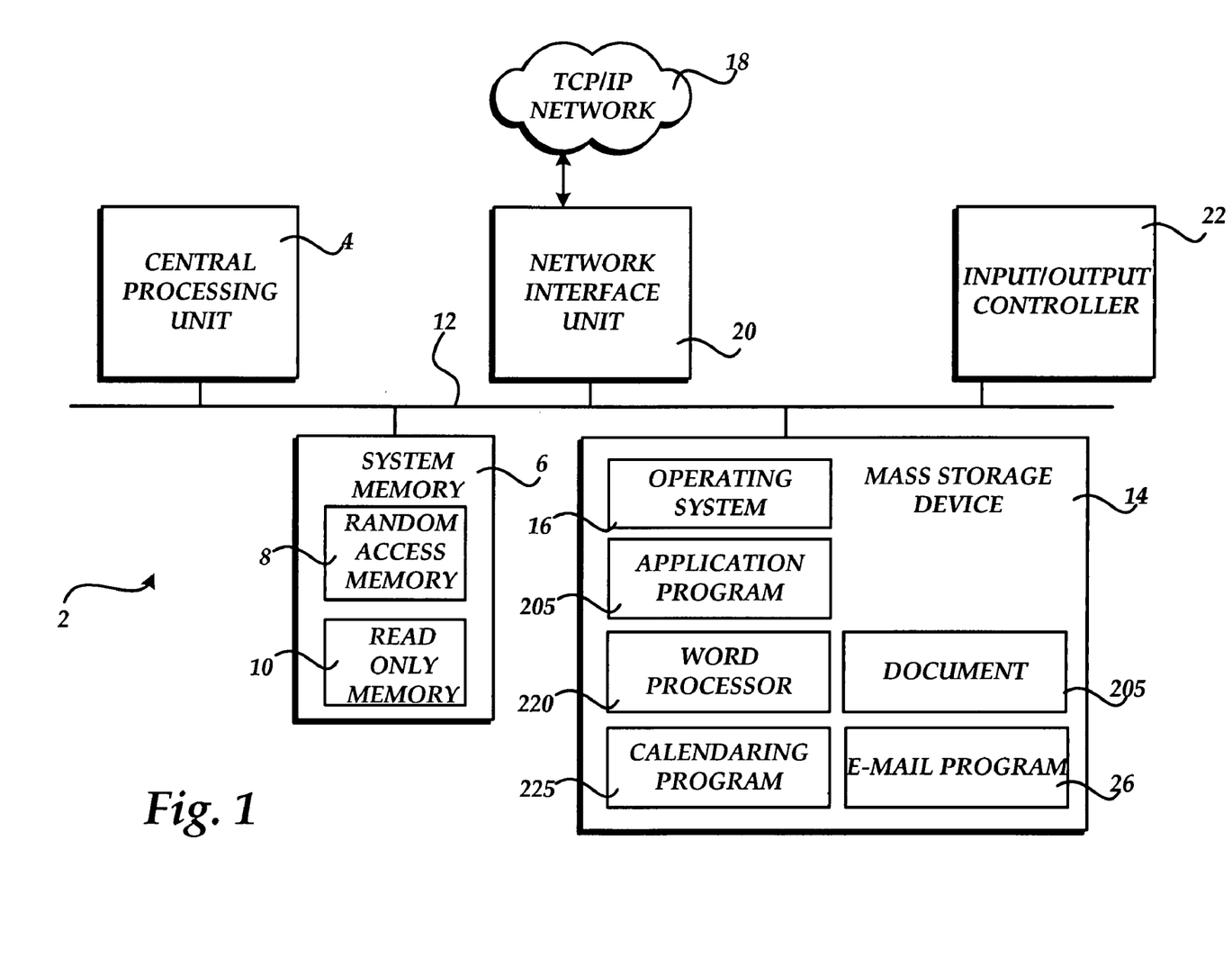
FIG. 1 is a block diagram showing the architecture of a personal computer that provides an illustrative operating environment for embodiments of the present invention.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with an application program that runs on an operating system on a personal computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a personal computer 2 for practicing the various embodiments of the invention will be described. The computer architecture shown in FIG. 1 illustrates a conventional personal computer, including a central processing unit 4 ("CPU"), a system memory 6, including a random access memory 8 ("RAM") and a read-only memory ("ROM") 10, and a system bus 12 that couples the memory to the CPU 4. A basic input/output system containing the basic routines that help to transfer information between elements within the computer, such as during startup, is stored in the ROM 10. The personal computer 2 further includes a mass storage device 14 for storing an operating system 16, application programs, such as the application program 205, and data.

The mass storage device 14 is connected to the CPU 4 through a mass storage controller (not shown) connected to the bus 12. The mass storage device 14 and its associated computer-readable media, provide non-volatile storage for the personal computer 2. Although the description of computer-readable media contained herein refers to a mass storage device, such as a hard disk or CD-ROM drive, it should be appreciated by those skilled in the art that computer-readable media can be any available media that can be accessed by the personal computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 2 may operate in a networked environment using logical connections to remote computers through a TCP/IP network 18, such as the Internet. The personal computer 2 may connect to the TCP/IP network 18 through a network interface unit 20 connected to the bus 12. It should be appreciated that the network interface unit 20 may also be utilized to connect to other types of networks and remote computer systems. The personal computer 2 may also include an input/output controller 22 for receiving and processing input from a number of devices, including a keyboard or mouse (not shown). Similarly, an input/output controller 22 may provide output to a display screen, a printer, or other type of output device.

As mentioned briefly above, a number of program modules and data files may be stored in the mass storage device 14 and RAM 8 of the personal computer 2, including an operating system 16 suitable for controlling the operation of a networked personal computer, such as the WINDOWS operating systems from MICROSOFT CORPORATION of Redmond, Wash. The mass storage device 14 and RAM 8 may also store one or more application programs. In particular, the mass storage device 14 and RAM 8 may store an application program 205 for creating and editing an electronic document 24. For instance, the application program 205 may comprise a word processing application program, a spreadsheet application, a contact application, and the like. Other applications illustrated in FIG. 1 and applicable to embodiments of the present invention include the word processing application 220, the calendar application 225 and the electronic mail application 26.

Figure 2:
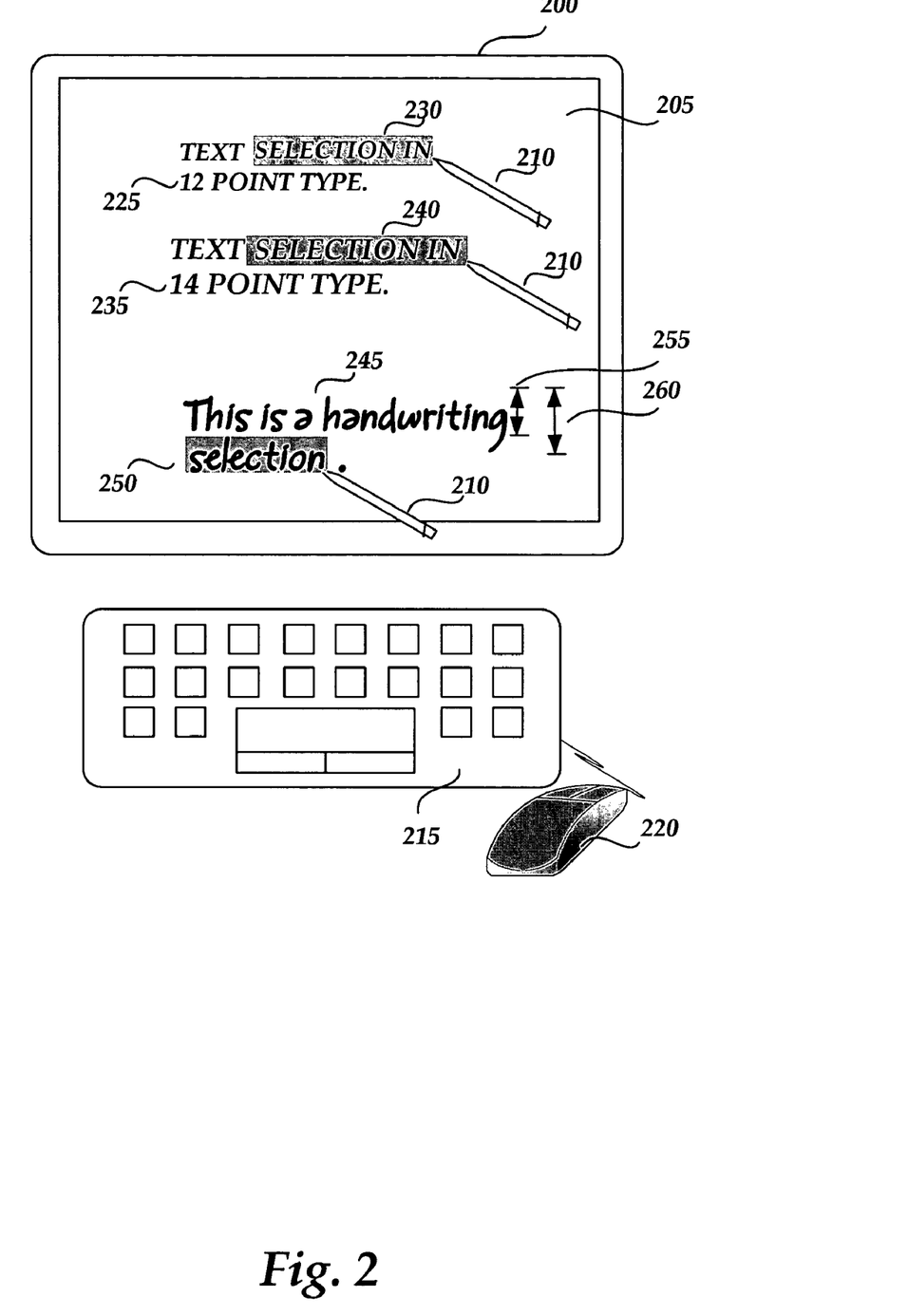
FIG. 2 is a simplified diagram illustrating a computer screen display adapted for use with an electronic pen and showing a computer keyboard and associated input devices.

As briefly described above, embodiments of the present invention allow for automatic adjustment of electronic highlighter cursor or ink height in response to a determined height of typed or handwritten text or in response to a determined height of a computer-displayed object. Referring to FIG. 2, a computer screen display 200 is illustrative of a computer screen display for a conventional personal computer, a tablet type computer, a personal digital assistant, or any other electronic device that allows for the display of text or data and that allows for interaction between a user and the screen via an electronic pen 210. As shown in FIG. 2, an electronic pen 210 is illustrated touching the surface of the screen 205. As is known to those skilled in the art, electronic pen and ink systems such as illustrated in FIG. 2 allow a user to utilize the electronic pen 210 to write in free-form text on the screen 205, allow the user to markup text previously entered using a keyboard or an electronic pen, and allow the user to select data displayed on the screen 205 for applying some type of functionality. Mechanisms for operation of electronic pen and ink systems with computer screen displays, such as illustrated in FIG. 2, are well known to those skilled in the art.

In addition to the electronic pen 210, a keyboard 215 and an associated mouse 225 are illustrated. Mousing devices such as the mouse 225 are well known to those skilled in the art for allowing a user to move a cursor about the computer display screen 205, select and searching points for inserting text and data, select text or data for applying formatting or other functionality, and the like. In accordance with embodiments of the present invention, the electronic pen 210 and the mousing device 220 may be selectively placed into highlighter mode for allowing a user to highlight text or images on the screen 205 by dragging the tip of the electronic pen 210 across the screen 205 or by moving a mouse cursor across the screen 205 by movement of the mouse 220. Accordingly, the electronic pen 210 and the mousing device 220 may be used electronically in a fashion similar to the use of a manual highlighting pen where a user may drag the tip of a highlighting pen across a sheet of paper to distribute highlighting ink across the paper and onto text or images that the user wishes to highlight.

Referring still to FIG. 2, a first text selection 225 is illustrated including a typed sentence that is typed in 12-point font. The highlighter pen 210 is illustrated in highlighter mode and is illustrated as highlighting the words "selection in" 230 contained in the text selection 225. A second text selection 235 is illustrated typed in 14-point type, and the electronic pen 210 is illustrated as highlighting the words "selection in" 240 of the text selection 235. A handwritten text selection 245 is illustrated, and the electronic pen 210 is illustrated as highlighting the word "selection" 250 of the text selection 245. As illustrated in FIG. 2, the text selections 225 and 235 are both typed text selections, but are of varying heights because the text selection 235 has been entered in 14-point type. The text selection 245 is also of a varying height relative to the text selections 225 and 235 because the text selection 245 has been entered by handwriting on the screen 205 using the electronic pen 210 in pen mode.

Figure 2B:
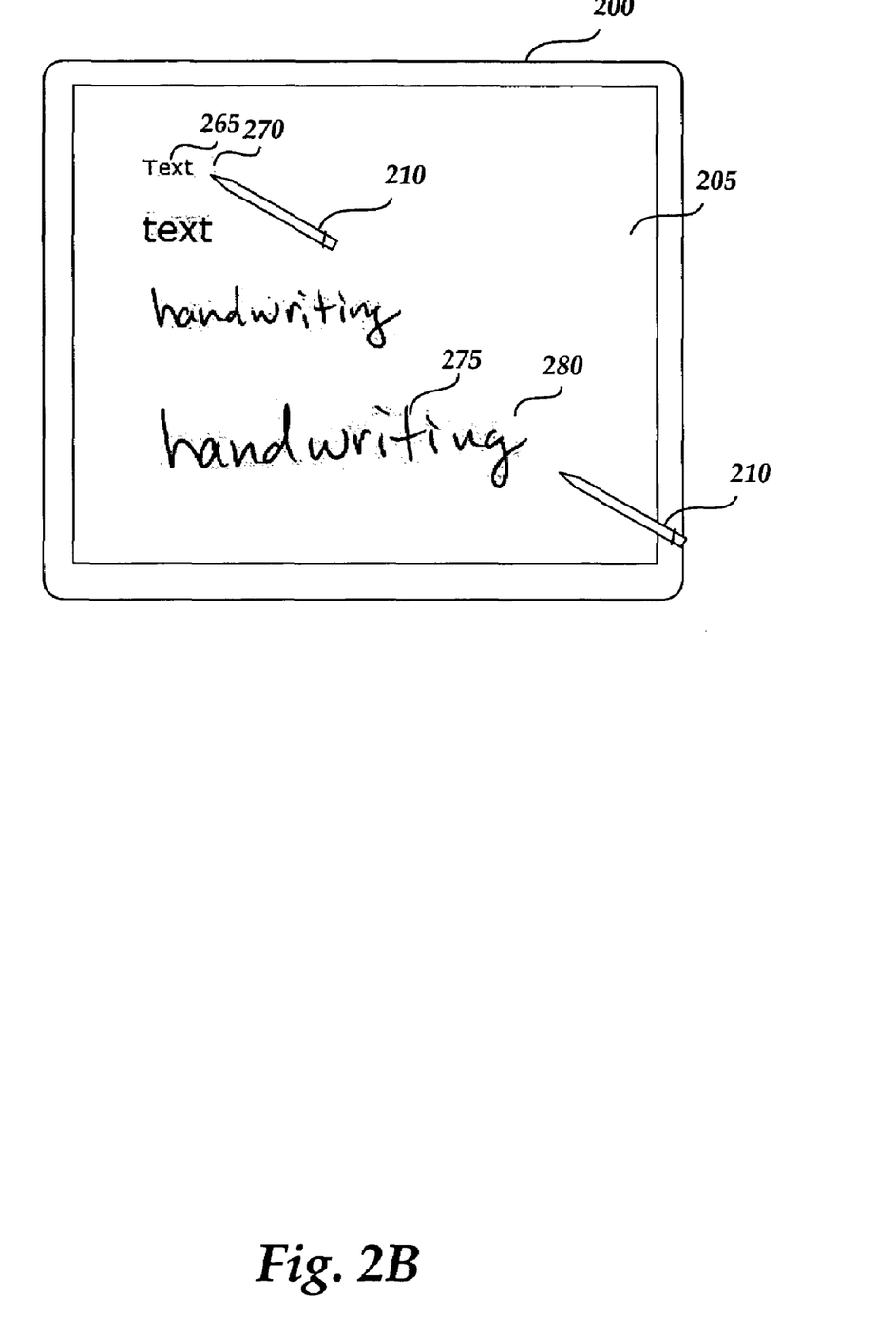
FIG. 2B is a simplified diagram illustrating an actual operation of embodiments of the present invention for highlighting a plurality of text selections.

FIG. 2B illustrates an actual operation of embodiments of the present invention for varying the highlighter cursor or ink height relative to the height of an object such as typed or handwritten text. A typed text selection 265 comprising the word "Text" is highlighted with highlighter ink 270 at a height adjusted for the height of the text selection 265. When the user moves the pen 210 to the handwritten text selection 275, the highlighter cursor or ink height automatically adjusts so that the ink 280 covers the height of the handwritten text selection 275. As illustrated in FIG. 2B, the electronic pen 210 acts in a similar manner as a manual highlighter pen with ink that matches the height of text or objects being highlighted. For example, ink flowing from a manual highlighter pen may be "wavy" according to the user's pen stroke. Likewise, the electronic highlighting ink 270, 280 rendered by stroke of the electronic pen 210 is displayed according to the user's pen stroke, including "waviness" associated with the user's natural pen stroke. That is, the electronic ink flows wherever the user drags the electronic pen, but importantly, the height of the ink is adjusted to the height of the text or object being highlighted. As will be discussed below, according to an embodiment of the invention, the adjusted ink height remains at an adjusted height until the user finishes a given pen stroke and lifts the pen or otherwise disengages the highlighting action.

Figure 3:
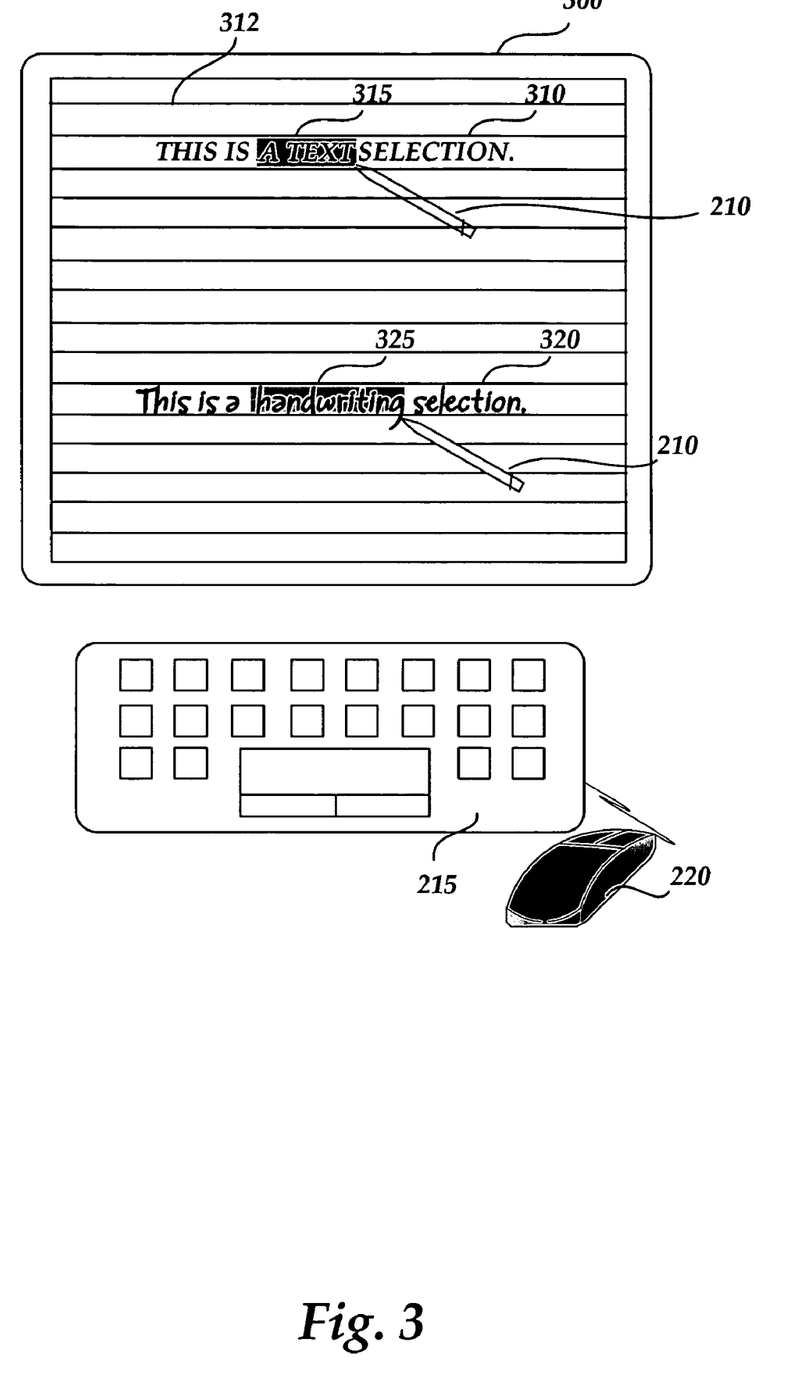
FIG. 3 is a simplified diagram illustrating a computer screen display adapted for use with an electronic pen and showing a computer keyboard and associated input devices where the computer screen display is set in rule line mode.

Referring to FIG. 3, a computer screen display 300 is illustrated wherein a user has selected the display in rule line mode. That is, by selecting rule line mode, a plurality of rule lines 312 are displayed on the computer screen display 300 for giving the computer screen 300 an appearance of a rule lined notepad page or paper. A typed text selection 310 is illustrated having a highlighted section 315 wherein the words "a text" have been highlighted by the electronic pen 210. A handwritten text selection 320 is illustrated having a highlighted section 325 wherein the word "handwriting" has been highlighted by the electronic pen 210 after the electronic pen 210 has been selectively placed into highlighter mode. As will be described below with reference to FIG. 4, the highlighter cursor height may be set to the distance between the given pair of rule lines 312.

Referring back to the handwritten text selection 245, illustrated in FIG. 2, the general height 255 of the handwritten text selection is illustrated. According to embodiments of the present invention, the general height 255 of the handwritten text selection is determined by ignoring the lengths of ascending and descending character segments such as the looped tail of the character "g" in the word "handwriting." As will be described with reference to FIG. 4 below, according to one embodiment of the present invention, the proper highlighter cursor height for use with a handwritten text selection such as the selection 245 may be adjusted to the general height 255 of the handwritten text selection. Alternatively, the highlighter cursor height may be adjusted to the maximum height 260 of the handwritten text selection, including the lengths of ascending and descending character segments such as the looping tail of the character "g" of the word "handwriting." For determining the general height 255 of a handwritten text selection 245, methods may be used whereby a determination is made as to the height associated with the statistically significant text input. For example, for the text selection 245, the general height 255 of the word "handwriting" may be determined by considering the maximum height of text input for writing the word "handwriting" without consideration of ascending and descending character segments such as the top of the letter "t" and the looping tail of the letter "g". For a detailed discussion of methods and systems for determining the general height 255 of handwritten text such as the handwritten text selection 245, see U.S. patent application entitled "Writing Guide For A Free-Form Document Editor, Ser. No. 10/186,388, File Jun. 28, 2002, which is incorporated herein by reference as if fully set out herein.

Figure 4:
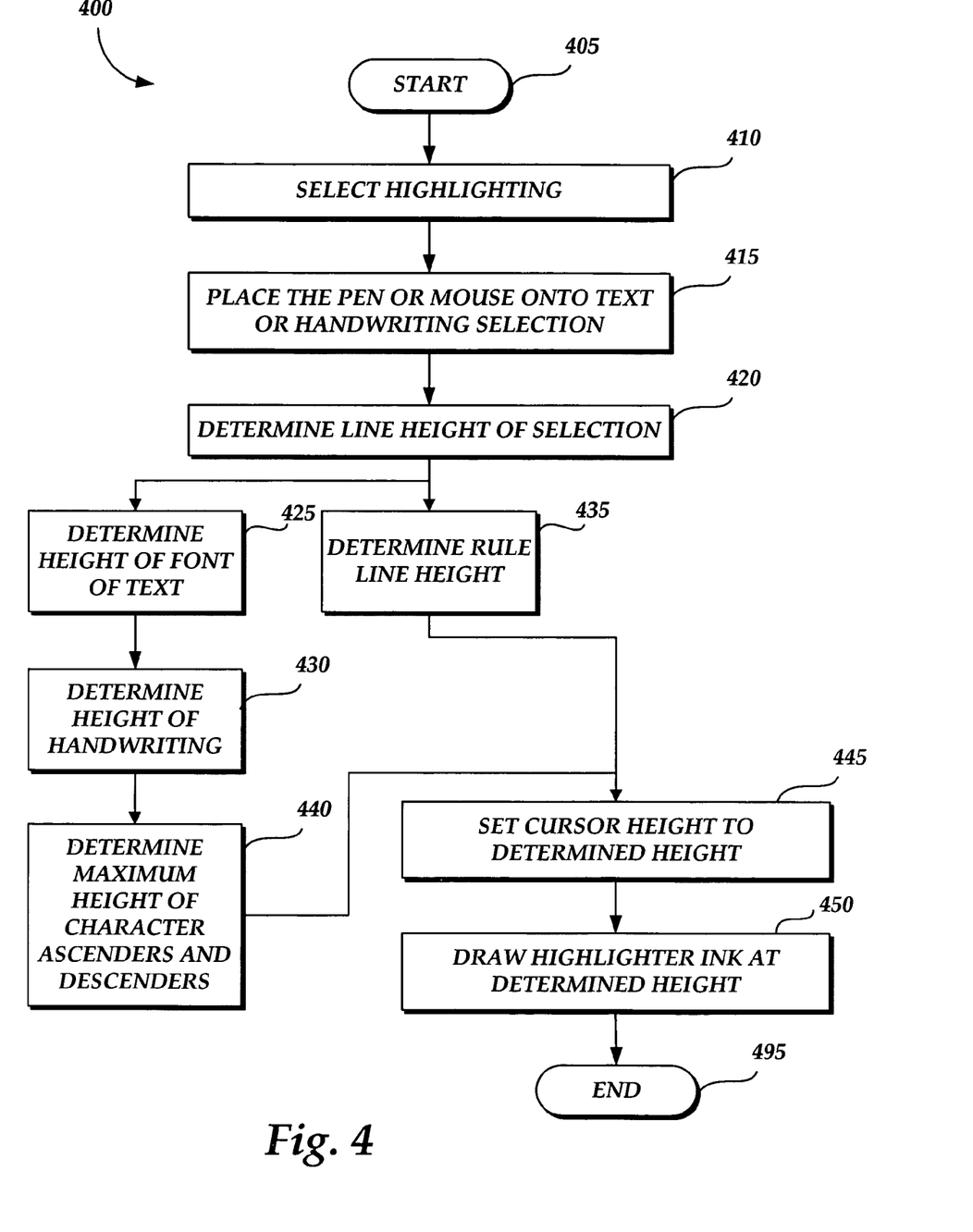
FIG. 4 is a flow diagram showing an illustrative routine for automatically adjusting an electronic highlighter cursor height relative to typed or handwritten text or images to be highlighted.

FIG. 4 is a flow diagram showing an illustrative routine for automatically adjusting an electronic highlighter cursor height relative to computer-displayed objects, such as typed or handwritten text or images, to be highlighted. The routine 400 begins at start block 405 and proceeds to block 410 where a user selects a highlighting functionality for utilizing the electronic pen 210 or mousing device 220 as an electronic highlighter. For purposes of illustration, consider for example that the user desires to highlight a portion of the 12-point type text selection 225, a portion of the 14-point type text selection 235, a portion of the handwritten text selection 245, illustrated in FIG. 2, and the user also desires to highlight a portion of the text selection 310 illustrated in FIG. 3. At block 415, the user places the tip of the highlighter pen 210 or places the mouse cursor of the mouse 220 over the desired text to be highlighted. For example, referring to FIG. 2, the user may place the tip of the electronic pen 210 at the beginning of the words "selection in" contained in the text selection 225 for purposes of dragging the tip of the electronic pen across the words "selection in" for highlighting those words. At block 420, a determination is made as to the line height of the portion of the text selection to be highlighted. For example, at block 420, the line height of the words "selection in" is determined for automatically adjusting the cursor height of the highlighter ink to be distributed onto the display 205 as the user drags the tip of the electronic pen 210 across the words "selection in."

According to embodiments of the present invention, it is desirable that the cursor height or the height of the electronic ink that is distributed onto the display screen 205 by the highlighter pen 210 be automatically adjusted to the height of the typed or handwritten text selection to be highlighted. That is, as shown in FIG. 2, the height of the typed text selection 230 is smaller than the height of the text selection 240. Similarly, the height of the handwritten text selection 245 also varies relative to the two typed text selections. It is desirable that the cursor height or height of the electronic pen highlighter ink be adjusted so that the user is able to highlight the full height of the typed or handwritten text as the user drags the tip of the electronic pen 210 across the text selection to be highlighted.

Referring still to FIG. 4, the determination of the line height of the text selection to be highlighted at block 420 may be determined according to a number of alternative embodiments. According to a first embodiment, the routine moves to block 425 and the height of a typed text selection such as the text selection 230, 240 may be determined from the font size used for displaying the text selection. For example, the text selection 225 illustrated in FIG. 2 is displayed in a 12-point type. The text selection 235 illustrated in FIG. 2 is displayed in a 14-point type. Because the font sizes (12 point versus 14 point) of the two text selections may be readily determined, the line height of those text selections may likewise be readily determined for adjusting the height of the highlighter cursor for use in highlighting a portion of the text selection.

After a determination of the height of the typed text selection is performed, the routine moves to block 430, and a determination is made of the height of a handwritten text selection such as the handwritten text selection 245. That is, if the user places the tip of the electronic pen 210 onto a handwritten text selection 245, a determination of the general height 255 of the handwritten selection may be performed, as described above. Accordingly, the determined general height 255 of the handwritten text selection to be highlighted may be adopted as the height of the highlighter cursor for use in highlighting the handwritten selection, such as the highlighted portion 250 of the handwritten selection 245 illustrated in FIG. 2.

According to an alternative embodiment, the cursor height for highlighting the handwritten text selection 245 may be determined by calculating the maximum height of the handwritten selection to be highlighted, including the height of ascending and descending character segments such as the looping tail of the character "g" of the word "handwriting" illustrated in FIG. 2. Accordingly, a cursor height calculated in this manner will be slightly higher than many of the characters in a given text selection such as the word "selection" illustrated in the text selection 245 of FIG. 2, but the cursor height will be high enough to ensure the user that the electronic ink flowing from the electronic highlighter pen 210 may cover all of the handwritten text selection to be highlighted.

According to an alternative embodiment of the present invention, the electronic cursor height may be determined from the distance between rule lines displayed on a computer screen display 300 displayed in rule line mode. According to this embodiment, the routine 400 proceeds to block 435, and a determination is made as to the distance between rule lines 312 of the display screen 300 between which a text selection has been entered where the text selection contains a portion of text to be highlighted by the user. That is, if the user touches the tip of the electronic pen 210 to a portion of the text selection 310 illustrated between the rule lines 312 of the computer screen display 300, a determination is made as to the distance between the rule lines containing the text selection to be highlighted. Accordingly, the distance between the rule lines is adopted as the height of the cursor height, and the cursor height is automatically adjusted to that distance. When the user drags the tip of the electronic pen 210 across the text selection 310, the height of the highlighter cursor is automatically adjusted to a height equal to the distance between the rule lines so that the user may highlight a portion of the text such as the portion 315 containing the words "a text" illustrated in FIG. 3. As should be understood by those skilled in the art, the methods described herein are equally applicable to highlighting an image drawn on or copied to the display screen 205 by determining the height of the drawn or copied image and by automatically adjusting the highlighter cursor height to the height of the image to allow the user to distribute highlighter ink onto the image at a height equal to the height of the image.

Once the desired cursor height is determined, as described above for one of the alternative embodiments, the routine proceeds to block 445, and the cursor height is set to the determined height. At block 450, the user is free to draw highlighter ink at the determined height across the display screen 205 and across desired typed or handwritten text selections in order to highlight those selections. Once the user has highlighted all desired typed or handwritten text, the user may disengage the highlighting action by lifting the electronic pen 210 from the display screen 205, or by selectively placing the electronic pen 210 or the mousing device 220 out of highlighter mode. If the electronic pen 210 or mousing device 220 is still in highlighter mode, the user may begin a second highlighting action by placing the tip of the electronic pen 210 or the mouse cursor onto or over a different text selection, and an automatic adjustment of the cursor height will be performed to adjust the cursor height to the height of the second text selection to be highlighted. That is, if the second text selection to be highlighted by the user is higher than the previous text selection, the cursor height is automatically adjusted to the height of the second text selection, as described herein. The user may disengage from the highlighting mode by lifting the electronic pen 210 from the display screen 205, or by selectively placing the electronic pen 210 or mousing device 220 out of highlighter mode. The routine ends at block 495.

As described herein, methods and systems are provided for automatically adjusting electronic highlighter cursor height in response to a determined height of typed or handwritten text or to a determined height of images to be highlighted on a computer-generated display screen. It will be apparent to those skilled in the art that various modifications or variations may be made in the present invention without departing from the scope or spirit of the invention. Other embodiments of the present invention will be apparent to those skilled in the art from consideration of the specification and practice of the invention disclosed herein.

I claim:

1. A computer-readable storage medium containing computer-executable instructions which when executed by a computer automatically adjust the electronic ink height of an electronic highlighter device, comprising:

selecting an electronic pen for functioning as an electronic highlighter device;

engaging the electronic pen with a computer-displayed handwritten text selection;

in response to engaging the electronic pen with the computer-displayed handwritten text selection, automatically determining the height of the computer-displayed handwritten text selection from the engagement, wherein determining the height of the computer-displayed handwritten text selection from the engagement includes determining an average height of the computer-displayed handwritten text selection without considering the length of any ascending or any descending character segments of any characters comprising the computer-displayed handwritten text selection;

after the automatic determination of the height of the computer-displayed handwritten text selection, setting the electronic ink height of the electronic pen to the determined height, wherein the set electronic ink height of the electronic pen is configured to highlight the average height of the computer-displayed handwritten text selection without highlighting any ascending or any descending character segments of any characters comprising the computer-displayed handwritten text selection; and after the setting of the electronic ink height of the electronic pen to the determined height, receiving a highlight input via the electronic pen, wherein the highlight input causes the distribution of the electronic ink at the determined height onto the computer-displayed handwritten text selection.

2. The computer-readable medium of claim 1, whereby selecting an electronic pen for functioning as an electronic highlighter device includes selecting an electronic mousing device for functioning as an electronic highlighter device; and whereby engaging the electronic pen with a computer-displayed handwritten text selection includes focusing a cursor of the electronic mousing device over the computer-displayed handwritten text selection and clicking the electronic mousing device for distributing electronic ink onto the computer-displayed handwritten text selection.

3. A computer-implemented method for automatically adjusting the electronic ink height of an electronic highlighter device, comprising:

selecting an electronic pen for functioning as an electronic highlighter device;

engaging the electronic pen with a computer-displayed handwritten text selection;

in response to engaging the electronic pen with the computer-displayed handwritten text selection, automatically determining the height of the computer-displayed handwritten text selection from the engagement, wherein determining the height of the computer-displayed handwritten text selection from the engagement includes determining an average height of the computer-displayed handwritten text selection without considering the length of any ascending or any descending character segments of any characters comprising the computer-displayed handwritten text selection;

after the automatic determination of the height of the computer-displayed handwritten text selection, setting the electronic ink height of the electronic pen to the determined height, wherein the set electronic ink height of the electronic pen is configured to highlight the average height of the computer-displayed handwritten text selection without highlighting any ascending or any descending character segments of any characters comprising the computer-displayed handwritten text selection; and after the setting of the electronic ink height of the electronic pen to the determined height, receiving a highlight input via the electronic pen, wherein the highlight input causes the distribution of the electronic ink at the determined height onto the computer-displayed handwritten text selection.

4. The computer-implemented method of claim 3, whereby selecting an electronic pen for functioning as an electronic highlighter device includes selecting an electronic mousing device for functioning as an electronic highlighter device; and whereby engaging the electronic pen with a computer-displayed handwritten text selection includes focusing a cursor of the electronic mousing device over the computer-displayed handwritten text selection and clicking the electronic mousing device for distributing electronic ink onto the computer-displayed handwritten text selection.

5. A system for automatically adjusting the electronic ink height of an electronic highlighter device, comprising:

a processor; and a memory having computer-executable instructions stored thereon, wherein the computer-executable instruction are configured for;

selecting an electronic pen for functioning as an electronic highlighter device;

engaging the electronic pen with a computer-displayed handwritten text selection;

in response to engaging the electronic pen with the computer-displayed handwritten text selection, automatically determining the height of the computer-displayed handwritten text selection from the engagement, wherein determining the height of the computer-displayed handwritten text selection from the engagement includes determining an average height of the computer-displayed handwritten text selection without considering the length of any ascending or any descending character segments of any characters comprising the computer-displayed handwritten text selection;

after the automatic determination of the height of the computer-displayed handwritten text selection, setting a height of a cursor for inputting electronic highlighter ink to the determined height, wherein the height of the cursor is configured to highlight the average height of the computer-displayed handwritten text selection without highlighting any ascending or any descending character segments of any characters comprising the computer-displayed handwritten text selection;

after the setting of the height of the cursor to the determined height, receiving a highlight input via the electronic pen, wherein the highlight input causes the distribution of the electronic ink at the determined height onto the computer-displayed handwritten text selection;

after disengaging the highlight input engaging the electronic pen with a computer-displayed object other than the computer-displayed handwritten text selection;

in response to engaging the electronic pen with the computer-displayed object, automatically discarding the determined height and determining the height of the computer-displayed object from the engagement;

after the automatic determination of the height of the computer-displayed object, setting the electronic ink height of the electronic pen to the determined height; and after the setting of the electronic ink height of the electronic pen to the determined height, receiving a highlight input via the electronic pen, wherein the highlight input causes the distribution of the electronic ink at the determined height onto the computer-displayed object.

6. The system of claim 5, whereby selecting an electronic pen for functioning as an electronic highlighter device includes selecting an electronic mousing device for functioning as an electronic highlighter device; and whereby engaging the electronic pen with a computer-displayed handwritten text selection includes focusing a cursor of the electronic mousing device over the computer-displayed handwritten text selection and clicking the electronic mousing device for distributing electronic highlighter ink onto the computer-displayed handwritten text selection.

7. The system of claim 5, wherein the computer-displayed object is an image and the determined height is a height of the image.

8. The system of claim 5, wherein the computer-displayed object is font text and the determined height is a font size.

9. The system of claim 5, wherein the computer-displayed object is a second computer-displayed handwritten text selection and the determined height is a height of the second computer-displayed handwritten text selection.

10. The system of claim 5, wherein the computer-displayed object is a second computer-displayed handwritten text selection and the determined height is determined from an average height of the second computer-displayed handwritten text selection without considering the length of any ascending or any descending character segments of any characters comprising the second computer-displayed handwritten text selection.

11. The system of claim 5, wherein the computer-displayed object is a second computer-displayed handwritten text selection and the determined height is determined from ruled lines of a display.

* * * * *